United States Patent [19]
Wood

[11] Patent Number: 5,557,175
[45] Date of Patent: Sep. 17, 1996

[54] BATTERY OPERATED INVERTER CIRCUIT FOR CAPACITIVE LOADS SUCH AS ELECTROLUMINESCENT LAMPS

[75] Inventor: Grady M. Wood, Melbourne, Fla.

[73] Assignee: Harris Corporation, Melbourne, Fla.

[21] Appl. No.: 490,016

[22] Filed: Jun. 13, 1995

[51] Int. Cl.⁶ .................................................. H05B 37/00
[52] U.S. Cl. ...................................................... 315/200 R
[58] Field of Search ........................... 315/169.3, 200 R, 315/226, 283, 167, 205, 241 R, 246, 219, 291, 362

[56] References Cited

U.S. PATENT DOCUMENTS

| | | | |
|---|---|---|---|
| 4,253,097 | 2/1981 | Hochstrate | 315/169.3 X |
| 4,527,096 | 7/1985 | Kindlmann | 315/169.3 |
| 4,937,647 | 6/1990 | Sutton | 315/169.3 X |
| 5,027,040 | 6/1991 | Ikeda et al. | 315/241 R |
| 5,313,141 | 5/1994 | Kimball | 315/169.3 |
| 5,323,305 | 6/1994 | Ikeda et al. | 315/169.3 X |
| 5,336,978 | 8/1994 | Alessio | 315/169.3 |
| 5,347,198 | 9/1994 | Kimball | 315/167 |

*Primary Examiner*—Robert Pascal
*Assistant Examiner*—Haissa Philogene
*Attorney, Agent, or Firm*—Nixon, Hargrave, Devans & Doyle

[57] ABSTRACT

In a switching inverter where switches are controlled so as to provide current through an inductor which is connected in series with other switches across a battery so as to power a capacitive load, such as an electroluminescent lamp, with higher voltage than the battery voltage, the other switches, which may be SCRs, provide a path for current which charges and discharges the lamp to provide the higher voltage as an alternating voltage across the load. These other switches are switched on in synchronism with pulses of current which are produced in the inductor by circuits providing capacitances at the triggering terminals of the other switches (control electrodes or gates in the case of SCRs). These circuits are connected to the inductor so that transients or spikes, occurring when the current through the conductor is switched, enable triggering current flow with respect to the capacitances. This triggering current flow automatically triggers the other switching devices. Then, charging and discharging current paths to the load are established through these devices so as to enable the higher AC voltage to be developed across the load. The efficiency of the inverter may be increased by directing the discharge current from the load, in part, through the battery thereby recovering some of the battery energy during the discharge half cycle of the inverter. A resistor in the circuit for the triggering current provides a bias voltage which causes devices in the circuit which switches current through the inductor to pass a portion of the discharge current from the load to the battery.

14 Claims, 4 Drawing Sheets

BATTERY OPERATED INVERTER CIRCUIT FOR CAPACITIVE LOADS SUCH AS ELECTROLUMINESCENT LAMPS

SUMMARY

The present invention relates to inverter circuits for driving a capacitive load at a voltage higher than a supply voltage by switching current through an inductor which is connected to the load, and particularly to inverter circuits using a switched inductor which is resonant with a capacitive load for applying an AC voltage across the load at lower frequency than the frequency at which the current there through is switched. This invention is related to the inventions disclosed in U.S. patent application Ser. Nos. 08/490,566 and 08/490,952, both filed Jun. 15, 1995.

The invention is especially suitable for use and improving, by reducing the complexity and increasing the efficiency, inverter circuits which are used to power devices which present the capacitive load, such as an electroluminescent lamp. Such electroluminescent lamp driving inverter circuits are shown in U.S. Pat. No. 5,313,141 issued May 17, 1994 to R. A. Kimball. Inverter circuits for driving capacitive loads, especially electroluminescent lamps enables such lamps to be used in miniature devices such as pagers and wrist watches. Such miniature devices use very low voltage (1 to 3 volt) batteries, and the inverter circuits are required to provide high voltage which is sufficient amplitude for operating the lamp, which may be about 100 volts. Such inverter circuits may also be of the H-bridge type such as shown in Kindlmann, U.S. Pat. No. 4,527,096 issued Jul. 2, 1985 as well as inverter circuits described in the above-referenced Kimball Patent.

It has been found in accordance with the invention that the complexity of inverter circuits for powering capacitive loads, and especially circuits of the type shown in the Kimball Patent (see FIG. 6 thereof) may be reduced by automatically triggering the switches through which current pulses are passed for charging and discharging the load to develop the desired high AC voltage across the load. The efficiency results from the replacement of multi-component triggering circuits and accompanying pulse generating circuits dedicated to such triggering circuits with triggering circuits with fewer components. The improved and less complex triggering facility provided in accordance with the invention operates by utilizing the transients or spikes which occur when the current through the inductor is switched. These transients are in synchronism with the desired times for switching of the switches in the charging and discharged current paths to the load. Accordingly, the later switches are triggered and rendered conductive in synchronism with the pulses for charging and discharging the load without the need for special synchronously operative triggering circuits such as shown in the Kimball Patent. The reduction in complexity is especially desireable since the inverter, except for the inductor and the load, are provided in an integrated structure such as an integrated circuit chip of sufficiently small size to fit in miniature devices having electroluminescent lamps such as wrist watches and pagers.

In accordance with another aspect of the invention, the efficiency of the inverter is enhanced, thereby increasing battery life, which is especially desirable when the inverter is used as a lamp driver in battery operated environment such as in wrist watches and pagers. It has been found in accordance with this aspect of the invention, and notwithstanding the teaching in the Kimball Patent against passing current on discharge of the electroluminescent lamp back to the battery, that a portion of the discharge current can be passed back into the battery for recharging the battery. In accordance with this aspect of the invention circuitry is provided, preferably using the circuit for automatically triggering the discharge and charging current switches, for directing a portion of the current flow upon discharge of the lamp back to the battery for partially recharging the battery. Since the energy discharged from the load (the electroluminescent lamp) is utilized and not entirely dissipated, efficiency and battery life is enhanced.

In accordance with still another aspect of the invention, the complexity of inverter circuits is further reduced by incorporating reverse blocking semiconductor switching devices, such as reverse blocking SCRs as the switches which carry the charge and discharge current from the load. Preferably the switches are implemented as four layer SCRs which are produced using complementary bipolar technology.

Accordingly, it is the principal object of the present invention to improve inverter circuits useful to develop AC voltages higher than supply voltage across a capacitive load and when the load is electroluminescent lamp is operated as a lamp driver by reducing their complexity, and if desired also increasing their efficiency.

A more specific object of the invention is to provide an improved inverter circuit having switches in the output thereof which carry current to the load which are automatically triggered thereby eliminating the need for additional circuitry to control switching, the elimination of such additional circuitry resulting in reduction in size (especially suitable when the inverter is to be implemented as an integrated circuit) and also reduced cost of fabrication of the inverter.

It is another object of the invention to provide circuitry in an inverter of the type utilizing a switched inductor for charging and discharging a capacitive load from a battery to return some of the energy stored in the load to the battery at a point when the polarity of the voltage across the load is reversed (i.e. when the load is being discharged), a portion of this energy also being transferred to the inductor and is returned to the load in the opposite polarity so as to provide AC voltage of sufficient magnitude to the load, as for illuminating an electroluminescent lamp which provides the load.

It is a still further object of the invention to provide a inverter circuit for operating a lamp at higher voltage than supply voltage utilizing pulses obtained by switching battery current through an inductor in which blocking diodes capable of blocking high voltages present in the circuit are eliminated by implementing the output switches of the inverter as high voltage reverse blocking SCRs which may be fabricated in accordance with complementary bipolar technology.

The invention has various aspects and may achieve one or more of the objects set forth above, the invention is not necessarily constrained to achievement of all of the objects together in one implementation thereof.

Briefly described, an inverter circuit powers a load presenting a capacitive impedance, which inverter circuit includes an inductor connected to the load via a plurality of first switching devices. Each of these first switching devices has a control or triggering terminal which triggers it into unidirectional current conduction. These devices are preferably SCRs and desirably four layer SCRs having gates connected to the anode and cathode thereof. The gates of SCRs provide control or triggering electrodes, terminals or as such terms are used herein.

The inverter also has a plurality of second switching devices connected in series with the inductor and with a voltage supply, such as a battery, between supply and return sides thereof. One of the second switching devices, connecting the supply side of the battery via the load, makes the connection via the inductor and one of the plurality of first switching devices to provide the unidirectional current in pulses to the load for charging the load to a voltage higher than the voltage provided by the battery during a first half cycle of a periodic or A.C. voltage. Another of the plurality of second switching devices connects the load to the return side of the battery via the inductor and another of said plurality of first switching devices to provide unidirectional current pulses to discharge the load during the second A.C. half cycle. An automatic triggering circuit triggers the output switching devices during the first and second half cycles upon occurrence of transients or spikes accompanying the pulses as the current through in the inductor is switched. This automatic triggering circuitry utilizes means for presenting a capacitance at the control electrode of the output switching devices and also utilizes means operated by the transients for enabling current to flow with respect to these capacitances to trigger the output switching devices upon occurrence of the transients. The output switching devices are thus triggered in synchronism with the pulses appearing across the inductor and at the outset, or leading edge, of each such pulse. In accordance with other aspects of the invention, the output switching devices may be implemented by reverse blocking SCRs. In accordance with a still further aspect of the invention, the circuit which presents the capacitance may also have a resistor, across which a bias voltage is developed, which biases the devices which switch the current from the battery through the inductor so that discharge current from the load flows, not only through the inductor, but also through the battery thereby returning energy to the battery and partially recharging the battery.

The foregoing and other objects features and advantages of the invention and presently preferred embodiments thereof will become more apparent from a reading of the following description in connection with the accompanying drawings in which:

DRAWINGS

Figure 1:
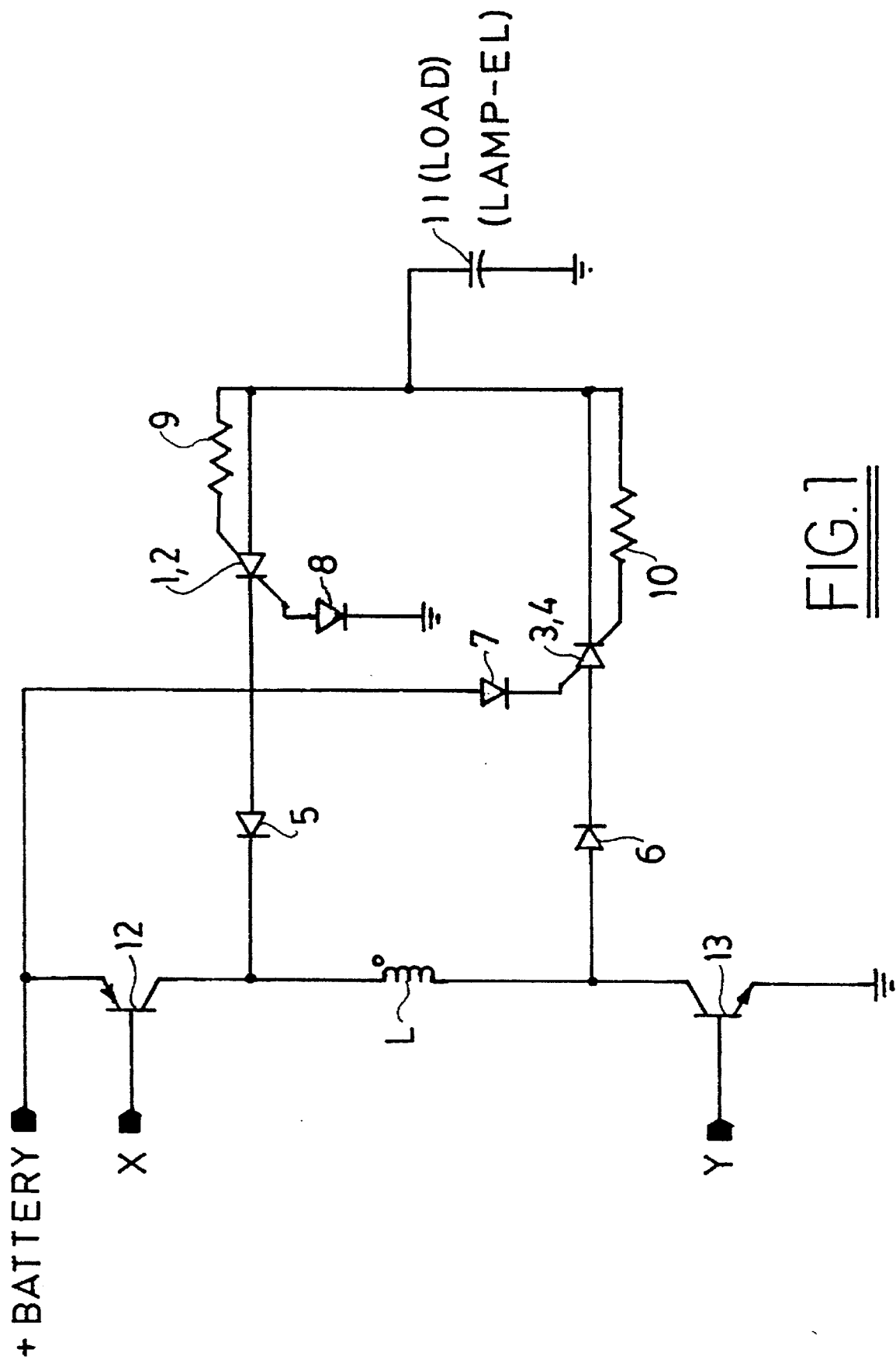
FIG. 1 is a schematic diagram of an inverter circuit embodying the invention having four layer SCRs as the output switches thereof.
Figure 2:
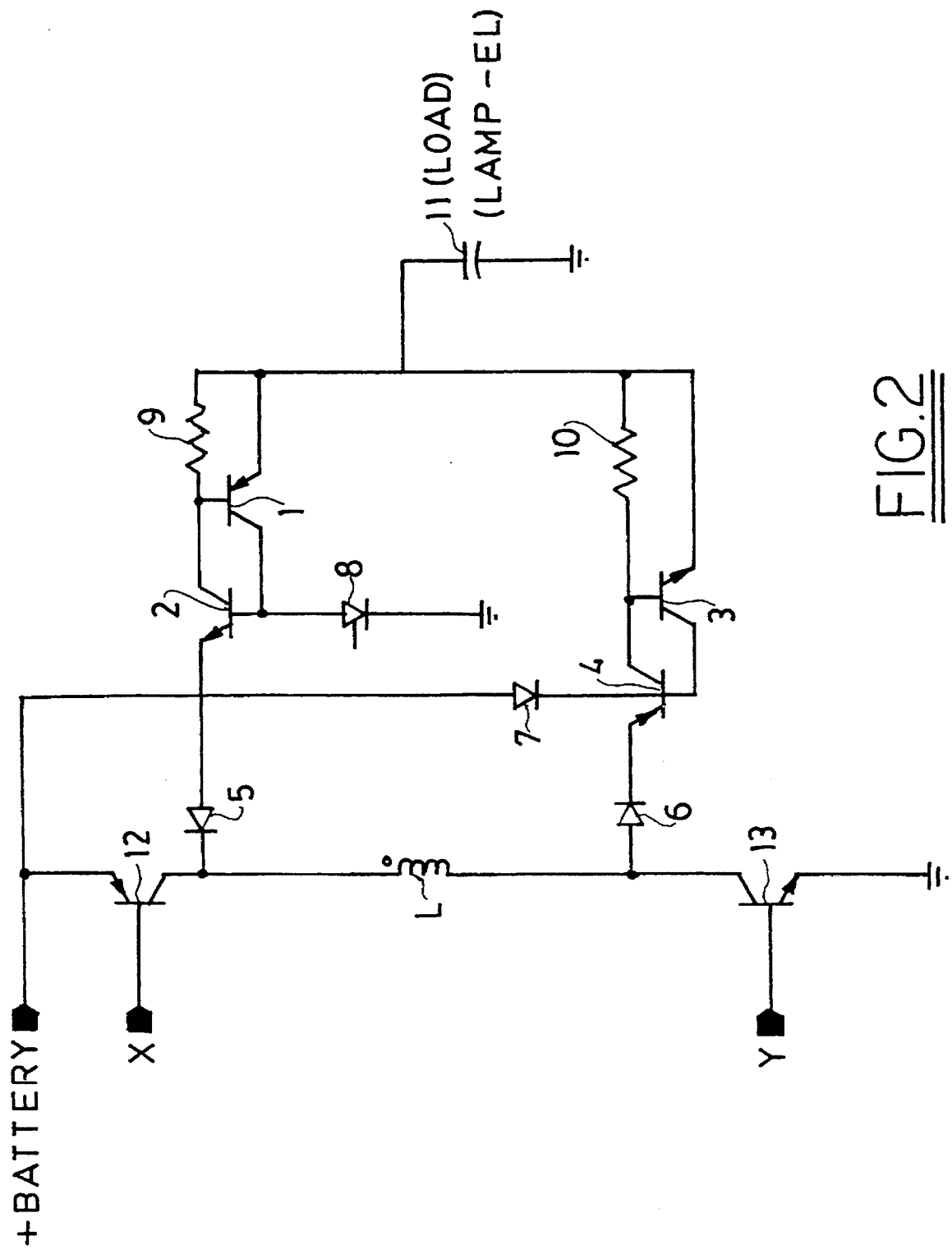
FIG. 2 is a circuit like that shown in FIG. 1 where the four layer SCRs are shown as interconnected bipolar transistors, such transistors representing the equivalent circuit of the four layer SCRs.
Figure 3:
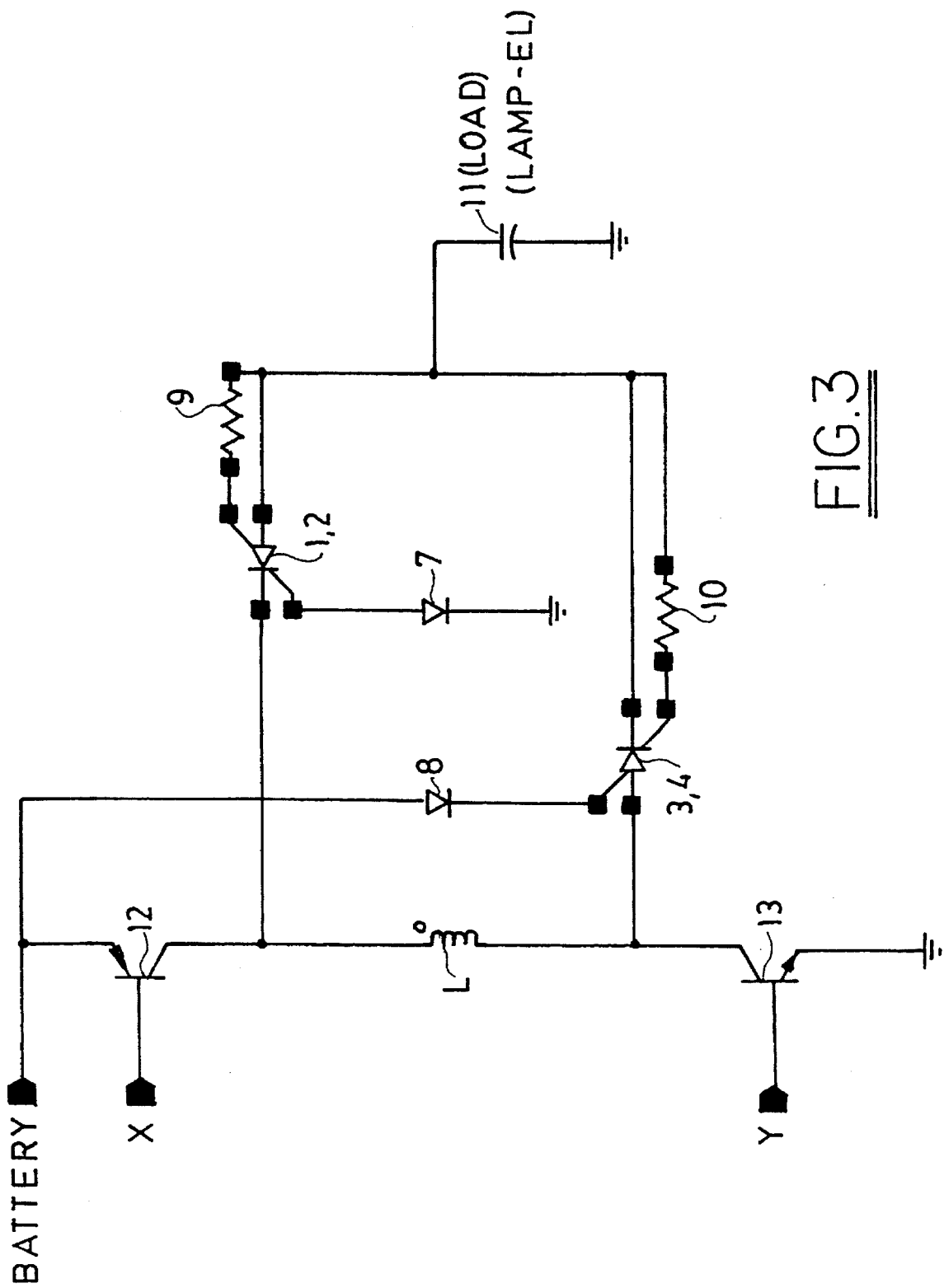
Figure 4:
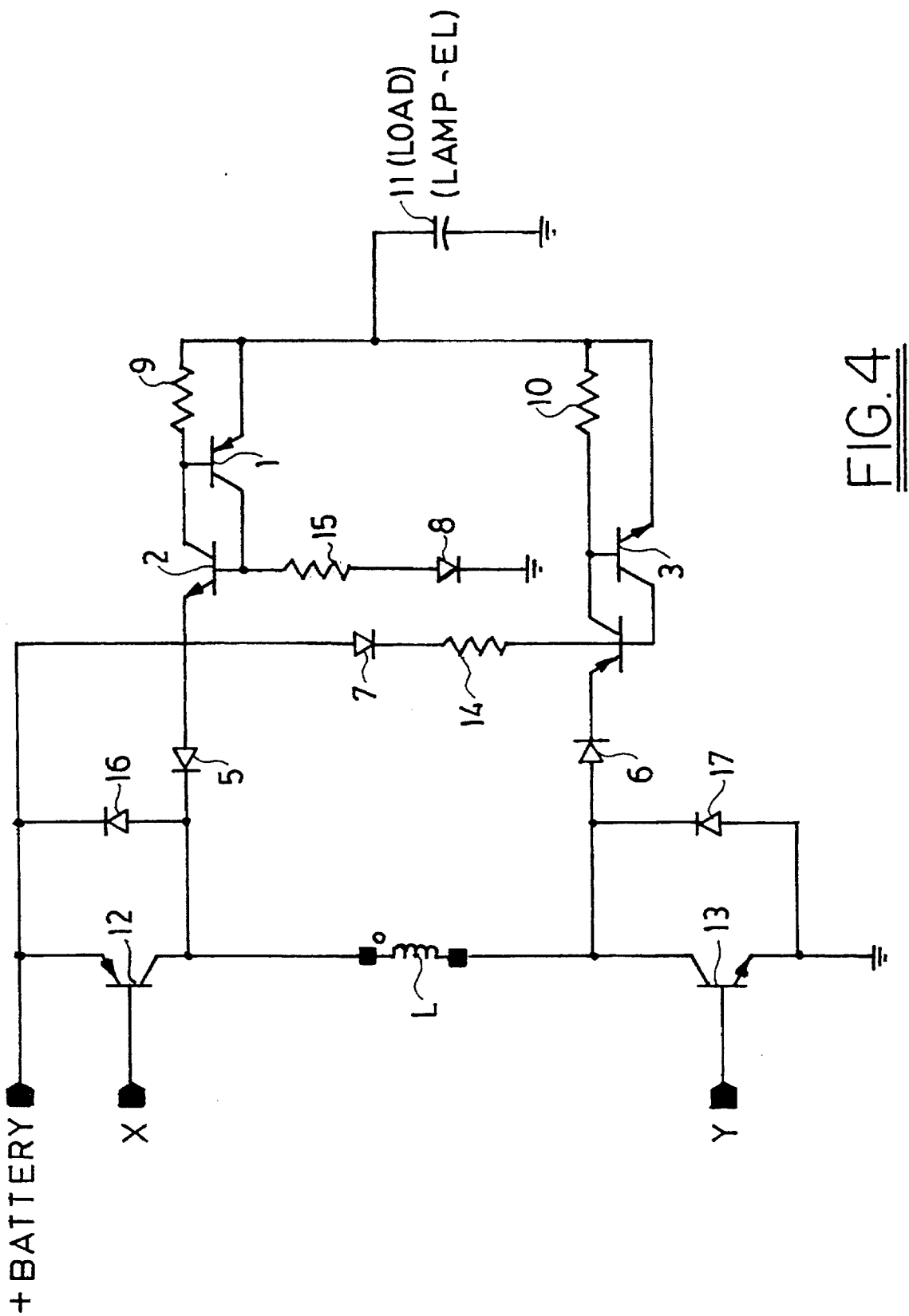

FIG. 3 is a schematic diagram showing circuits similar to the circuits of FIGS. 1 and 2 where the SCRs are reverse blocking SCRs and eliminate high voltage blocking diodes; and FIG. 4 is a schematic diagram of an inverter circuit similar to that shown in FIG. 2 and illustrating the circuitry which enables discharge current from the load to be recycled in part to the battery for returning energy and partially recharging the battery and in part to the inductor.

DETAILED DESCRIPTION

Referring to FIGS. 1 and 2, there is shown an inverter circuit having an inductor L for driving and powering a capacitive load 11 such an electroluminescent lamp. Transistors 12, 13 are connected in series with the inductor across the supply side (+) and the return side (ground) of the battery. The pulses for switching the transistors 12, 13 may have the waveforms shown at X and Y in the Kimball Patent (FIG. 7). The output switches of the inverter are provided by a four layer SCR 1, 2, which carries the discharge current pulses on the negative (below ground) half cycle of the AC voltage developed across the lamp 11 and another four layer SCR 3, 4 which provides the output switching device carrying the charging current for the lamp 11. The four-layer SCR devices are illustrated as equivalent interconnected bipolar transistor 1, 2 and 3, 4 circuits, in FIG. 2. The SCRs have cathode and anode triggering terminals or electrodes which are represented by the base connections to the transistors 1, 2 of the equivalent and also to the base junctions of the transistors 3, 4 of the SCR equivalent shown in FIG. 2. A desensitizing resistor 9 is connected between the cathode gate and anode of SCR 1, 2 and a similar desensitizing resistor 10 is connected between the cathode gate and cathode of SCR 3, 4.

Diode 7 provides, with the gate to anode junction of SCR 3, 4 a capacitance. The circuit between the anode of diode 7 and the supply side of the battery provides a current path for the discharge of the capacitance of the diode 7 and the gate anode junction of the SCR 3, 4. Another diode 8 connected to ground and to the gate SCR 1, 2 presents a capacitance to ground. The connection to ground providing a current path for the discharge of this capacitance.

The SCR switches 1, 2 and 3, 4 are respectively connected via blocking diodes 5 and 6. The diode 5 permits only the passage of discharge current. The diode 6 permits only passage of changing current.

The circuit described in FIGS. 1 and 2 operates generally in the same manner as the circuit shown in FIG. 6 in the Kimball Patent except that the inverter, by virtue of the diodes 7, 8 which present the capacitance, is self-triggering in synchronism with the pulses of current which pass through the inductor L. Synchronous triggering is provided by utilization of the spikes or transients accompanying the onset of each pulse.

The operation of the circuit of FIGS. 1 and 2 is believed to be as follows.

First consider the half cycle of the AC output voltage across the load 11 where the load is charged negatively with respect to ground. NPN switching transistor 13 is turned on by the negative pulses occurring during half cycle at input Y. Transistor switch 12 and transistor switch 13 are both on and the current through the inductor L starts to increase. This current is interrupted at the onset of the pulse switching transistor 12 off. The voltage at the upper terminal (marked with the dot in the drawing) exhibits a transient or spike in the negative direction. This voltage spike causes diode 5 to be forward biased. The capacitance formed at the base of transistor 2 and by the junction of diode 8 is discharged through the base emitter junction of transistor 2. This current sets off a regenerative action between transistors 2 and 1 (i.e. in the four-layer SCR 1, 2). Except for the small capacitive discharge current, which starts this regenerative action, all of the current required by the collapsing field in the inductor L is supplied from the capacitive load 11. The triggering occurs and is repeated in synchronism with the spike during each discharge current pulse through the output SCR switch 1,2. While the load 11 is being discharged, the SCR 3, 4 is held off. The resistor 10 and the junction in transistor 3 prevents transistor 3 (i.e the SCR 3, 4) from being triggered at its cathode gate as the steps of voltage occur, which form the negative half cycle of the voltage across the transistor steps (i.e. during the discharge of the load 11).

During the positive half cycle, while charging current to the lamp is applied in unidirectional pulses, the emitter of transistor 4 receives a positive going spike which causes discharge of the capacitance in the junction of diode 7 and in the base to emitter (gate to anode) junction of SCR 3, 4. Regenerative action takes place which causes triggering of the SCR 3, 4 in synchronism with the onset of switching in the transistor 13 (in synchronism with the onset of each pulse applied to input Y). Accordingly, the operation during the positive half cycle is generally similar to the operation during the negative half cycle in both cases automatic triggering of the SCRs 1, 2 and 3, 4 occurs.

Referring to FIG. 3, the reverse blocking diodes 5, 6 are eliminated. Instead, the four-layer SCRs 1, 2 and 3, 4 are reverse blocking SCRs. These reverse blocking SCRs provide high voltage breakdown protection. High voltage bipolar processes or technology in which the layers are complementary (NPNP) are preferably used in implementing the high voltage reverse blocking SCRs 1, 2 and 3, 4 shown in FIG. 3.

Referring to FIG. 4, the circuit there shown is similar to the circuit shown in FIG. 2. In addition, bypass diodes 16, 17 are connected between collector and emitter of the switching transistors 12, 13, respectively. Resistors 14, 15 are connected in series with the diodes 7, 8 which carry the discharge of the junction capacitances in the diodes 7, 8 upon occurrence of the transients in the voltage across the inductor.

The resistors 14, 15 enable discharge current from the load 11 to be returned to the battery because the voltage across the resistors, especially resistor 15, during the discharge half cycle of the load 11 is sufficient to bias the base to emitter junction of transistor 2 above the battery supply voltage. Then the major portion of the current discharged from the load 11 follows two paths. Part of the current flows to the inductor and causes the voltage at the top (the output terminal marked with a dot) to rise above cutoff voltage for the transistor 12. Then, when the voltage at the collector of transistor 12 is above the battery voltage, a portion of the current which flows through the SCR 1, 2 is recycled back to the battery. The protective diodes 5, 16 provide an alternate path for this charging current. Thus the energy stored on one-half cycle in the load is recaptured by the battery, in part, during the next and opposite half cycle.

From the foregoing description, it will be apparent that there has been described inverter circuits especially suitable for operating an electroluminescent lamp which are less complex and more efficient than inverter circuits heretofore provided for the purpose. Variations and modifications in the herein described circuits, within the scope of the invention, will undoubtedly suggest themselves to those skilled in the art. Accordingly, the foregoing description should be taken as illustrative and not in a limiting sense.

I claim:

1. An inverter for powering a load presenting a capacitive impedance, which inverter includes an inductor connected to the load, via a plurality of first switching devices each having a terminal for triggering thereof into unidirectional current conduction, said inverter also having a plurality of second switching devices connected in series which said inductor and with a battery providing a voltage between supply and return sides thereof, one of said second switching devices connecting said supply side of said battery to said load via said inductor and one of said plurality of first switching devices to provide the unidirectional current in pulses to said load for charging said load to a voltage higher than the voltage provided by said battery during a first half cycle, and another of said plurality of second switching devices connecting said load to said return side via said inductor and another of said plurality of first switching devices to provide unidirectional current pulses to discharge said load during a second half cycle, and means for automatically triggering said one and said another first switching devices during said first and second half cycles upon occurrence of a transient accompanying said pulses including means presenting a capacitance at the control terminals of said first switching devices and means operated by said transient accompanying said pulses during said first and second half cycles for enabling current to flow with respect to said capacitance to trigger said first switching devices upon occurrence of the transient.

2. The inverter according to claim 1, wherein said means presenting said capacitance comprises diodes connected to the control terminals of said first switching devices.

3. The inverter according to claim 2, wherein said diodes are polarized in the direction to enable said unidirectional current through the first switching devices.

4. The inverter according to claim 3, wherein said diode connected to the control terminal of said one first switching device is connected between said supply side and said control terminal thereof, and said diode connected to the control terminal of said another of said first switching devices is connected between said return side and said control terminal thereof.

5. The inverter according to claim 1, wherein said first switching devices are provided by SCRs and said control terminals are triggering electrodes thereof.

6. The inverter according to claim 5, wherein said SCRs have anodes and cathodes and triggering electrodes on said anodes and cathodes which provide the control terminals thereof, said means presenting said capacitance comprises a first diode connected between the cathode triggering electrode of said SCR providing said another of said first switching devices and said return side, and a second diode connected between said anode triggering electrode of said SCR providing said one of said first switching devices and said supply side.

7. The inverter according to claim 6, further comprising resistors connected in series with said first and second diodes.

8. The inverter according to claim 6, wherein said means operated by said transients comprises a resistor connected between the cathode triggering electrode of the SCR providing said one first switching device and the cathode thereof and another resistor connected between the anode of said another first switching device and the anode triggering electrode thereof.

9. The inverter according to claim 5, wherein said SCRs are connected in unidirectional current passing relationships across said inductor via blocking diodes.

10. The inverter according to claim 5, wherein said SCRs are reverse blocking SCRs which prevent voltage breakdown in a direction opposite to the direction of unidirectional current flow therethrough.

11. The inverter according to claim 10, wherein said reverse blocking SCRs are complementary bipolar devices.

12. The inverter according to claim 1, further comprising means providing a path for current discharged from said load to said battery during said second half cycle.

13. The inverter according to claim 12 wherein said path providing means comprises at least means for biasing at least said another first switching device to conduct during discharge of said current from said load.

14. The inverter according to claim 13, wherein said path providing means comprises a diode connected in current bypassing relationship for current to said supply side across said one of said second switching devices.

* * * * *